(12) United States Patent
Katayama et al.

(10) Patent No.: US 12,014,148 B2
(45) Date of Patent: Jun. 18, 2024

(54) UTTERANCE GENERATION DEVICE, METHOD, AND PROGRAM

(71) Applicant: NIPPON TELEGRAPH AND TELEPHONE CORPORATION, Tokyo (JP)

(72) Inventors: Taichi Katayama, Tokyo (JP); Atsushi Otsuka, Tokyo (JP); Ko Mitsuda, Tokyo (JP); Ryuichiro Higashinaka, Tokyo (JP); Junji Tomita, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 393 days.

(21) Appl. No.: 17/285,444

(22) PCT Filed: Oct. 9, 2019

(86) PCT No.: PCT/JP2019/039864
§ 371 (c)(1),
(2) Date: Apr. 14, 2021

(87) PCT Pub. No.: WO2020/080228
PCT Pub. Date: Apr. 23, 2020

(65) Prior Publication Data
US 2022/0261556 A1    Aug. 18, 2022

(30) Foreign Application Priority Data

Oct. 16, 2018  (JP) ................................. 2018-195371

(51) Int. Cl.
*G06F 40/40* (2020.01)
*G06F 40/268* (2020.01)
(Continued)

(52) U.S. Cl.
CPC ............ *G06F 40/40* (2020.01); *G06F 40/268* (2020.01); *G06N 3/08* (2013.01)

(58) Field of Classification Search
CPC ...... G06F 40/40; G06F 40/268; G06F 40/216; G06F 40/35; G06N 3/08; G06N 3/045
(Continued)

(56) References Cited

U.S. PATENT DOCUMENTS

| 2005/0114327 A1* | 5/2005 | Kumamoto ......... G06F 16/3344 |
| 2019/0370389 A1* | 12/2019 | Blouw .................... G06N 3/049 |
| 2022/0261556 A1* | 8/2022 | Katayama ............. G06F 40/216 |

FOREIGN PATENT DOCUMENTS

| CN | 107209759 A | * | 9/2017 | ........... G06F 17/241 |
| JP | 2004133771 A | * | 4/2004 | |
| JP | 2006172110 A | * | 6/2006 | |
| JP | 2007157006 A | * | 6/2007 | |

(Continued)

OTHER PUBLICATIONS

Shitaoka et al. (2017) "Active Listening System for a Conversation Robot" Journal of Natural LanguageProcessing, vol. 24, No. 1, pp. 3-47.*

(Continued)

*Primary Examiner* — Edwin S Leland, III

(57) ABSTRACT

It is possible to ask an appropriate question for digging an utterance of the other party in depth. An interrogative search unit estimates an estimated used interrogative with a text, which is an utterance sentence, as an input, by using a predetermined rule or an estimator that has already learned, the estimated used interrogative being an interrogative related to the text. A candidate utterance sentence generation unit generates each of candidate utterance sentences for the utterance sentence with the text as an input through automatic utterance generation. Based on each of the candidate utterance sentences and an estimation result of the estimated (Continued)

used interrogative, a ranking unit ranks the candidate utterance sentenced, based on the scored.

20 Claims, 6 Drawing Sheets

(51) Int. Cl.
*G06N 3/045* (2023.01)
*G06N 3/08* (2023.01)

(58) Field of Classification Search
USPC .............................................................. 704/9
See application file for complete search history.

(56) References Cited

FOREIGN PATENT DOCUMENTS

| | | | | |
|---|---|---|---|---|
| JP | 2013167765 | A | * | 8/2013 |
| JP | 5674689 | B2 | * | 2/2015 |
| JP | 201648463 | | * | 4/2016 |
| JP | 201648463 | A | | 4/2016 |

OTHER PUBLICATIONS

Katayama et al. (2018) "Question Generation to Deepen Your Talk" Japanese Society for Artificial Intelligence National Convention (32nd), Jun. 5, 2018, pp. 1-3.*

Vinyals et al. (2015) "A Neural Conversational Model" Proceedings of the 31st International Conference on Machine Learning, Lille, France, 2015. JMLR: W&CP vol. 37, 8 pages.

* cited by examiner

ESTIMATED USED INTERROGATIVES

ITSU (WHEN), DARE GA (WHO),
DARE TO (WITH WHOM),
DOKO DE (WHERE), NANI O (WHAT)

| TEXT | wh_penalty |
|---|---|
| NAN DE (WHY) | 0 |
| DOKO DE YATTA NO? (WHERE WAS IT HELD?) | 1 |
| ITSU NO HANAMI? (WHEN WAS CHERRY BLOSSOM VIEWING HELD?) | 1 |
| DONNA KANJI DATTA? (HOW WAS IT?) | 0 |
| DARE TO ITTA NO? (WHO DID YOU GO WITH?) | 1 |

Fig. 4

| TEXT | Log(T\|S) | Log(S\|T) | wh_penalty | TOTAL VALUE |
|---|---|---|---|---|
| NAN DE (WHY) | -4.5 | -8 | 0 | -12.5 |
| DOKO DE YATTA NO? (WHERE WAS IT HELD?) | -4.6 | -7.2 | 1 | -12.8 |
| ITSU NO HANAMI? (WHEN WAS CHERRY BLOSSOM VIEWING HELD?) | -4.7 | -7.4 | 1 | -13.1 |
| DONNA KANJI DATTA? (HOW WAS IT?) | -4.8 | -7.6 | 0 | -12.4 |
| DARE TO ITTA NO? (WHO DID YOU GO WITH?) | -4.9 | -7.3 | 1 | -13.2 |

Fig. 5

UTTERANCE GENERATION DEVICE, METHOD, AND PROGRAM

CROSS-REFERENCE TO RELATED APPLICATIONS

This application is a U.S. 371 Application of International Patent Application No. PCT/JP2019/039864, filed on 9 Oct. 2019, which application claims priority to and the benefit of JP Application No. 2018-195371, filed on 16 Oct. 2018, the disclosures of which are hereby incorporated herein by reference in their entireties.

TECHNICAL FIELD

The present invention relates to an utterance generation apparatus, a method, and a program, and particularly to an utterance generation apparatus, a method, and a program for generating a response utterance to an utterance sentence.

BACKGROUND ART

In attempting to have an interview or the like using an interaction system, it is possible for the interaction system to prepare in advance utterance sentences for asking questions to the other party of an interaction (a user, a robot, an interaction system, or the like) with rules or the like. However, there is a problem that it is difficult to prepare questions for finding more about information of the other party, i.e., in-depth questions, with rules, because such questions change based on the content of utterances of the other party.

In order to solve such a problem, a technique related to automatic utterance generation has recently been proposed (NPL 1).

CITATION LIST

Non Patent Literature

NPL 1: Oriol Vinyals, Quoc V. Le, "A Neural Conversational Model", 22 Jul. 2015.

SUMMARY OF THE INVENTION

Technical Problem

However, generation of a response utterance with an in-depth question using such automatic utterance generation has the following two problems, for example.
(1) Questions for dealing with any utterance (e.g., "nan de (why)", "doshite (for what purpose)", and the like) are generated in many cases.
(2) Questions to ask about what is already known based on user utterances are generated.

The present invention has been made in view of the above circumstances, and an object of the present invention is to provide an utterance generation apparatus, a method, and a program that make it possible to select an appropriate question for digging an utterance of the other party in depth, from among a plurality of automatically generated questions.

Means for Solving the Problem

To achieve the object described above, an utterance generation apparatus according to a first invention includes an interrogative search unit configured to estimate an estimated used interrogative with a text, which is an utterance sentence, as an input, by using a predetermined rule or an estimator that has already learned, the estimated used interrogative being an interrogative related to the text, a candidate utterance sentence generation unit configured to generate each of candidate utterance sentences for the utterance sentence with the text as an input through automatic utterance generation, and a ranking unit configured to calculate a score for each of the candidate utterance sentences, based on the candidate utterance sentence and an estimation result of the estimated used interrogative, and rank the candidate utterances, based on the scores.

In the utterance generation apparatus according to the first invention, the ranking unit may compare a candidate utterance sentence including the estimated used interrogative and a candidate utterance sentence not including the estimated used interrogative among the candidate utterance sentences, and calculate a score each of the candidate utterance sentences, to make the candidate utterance sentence including the estimated used interrogative less likely to be selected.

In the utterance generation apparatus according to the first invention, the candidate utterance sentence generation unit may input the text into a machine learning model that has learned in advance to output, with an utterance sentence as an input, a candidate utterance sentence for the utterance sentence, and generate the candidate utterance sentences.

In the utterance generation apparatus according to the first invention, an interaction in an interaction system may be assumed to be ongoing, and the interrogative search unit may estimate the estimated used interrogative by using the predetermined rule or the estimator with a text serving as a context of the interaction and the text of the utterance sentence that has been input.

In the utterance generation apparatus according to the first invention, the ranking unit may calculate the score, based on a value representing a likelihood that the candidate utterance sentence appears in a case that the utterance sentence that has been input is provided, a value representing a likelihood that an input is the utterance sentence in a case that the candidate utterance sentence is provided, and a penalty value determined depending on whether the estimated used interrogative is included in the candidate utterance sentence.

An utterance generation method according to a second invention includes an interrogative search unit estimating an estimated used interrogative with a text, which is an utterance sentence, as an input, by using a predetermined rule or an estimator that has already learned, the estimated used interrogative being an interrogative related to the text, a candidate utterance sentence generation unit generating each of candidate utterance sentences for the utterance sentence with the text as an input through automatic utterance generation, and a ranking unit calculating a score for each of the candidate utterance sentences, based on the candidate utterance sentence and an estimation result of the estimated used interrogative, and ranking the candidate utterances, based on the scores.

A program according to a third disclosure is a program for causing a computer to function as each unit of the utterance generation apparatus according to the first disclosure.

Effects of the Invention

According to the utterance generation apparatus, the method, and the program of the present invention, it is possible to obtain effects that an appropriate question for digging an utterance of the other party in depth can be generated.

BRIEF DESCRIPTION OF DRAWINGS

FIG. 4 is a diagram illustrating an example of a case of extracting parts in each of which an estimated used interrogative is used in candidate utterance sentences.

FIG. 5 is a diagram illustrating an example of a calculation result of scores.

DESCRIPTION OF EMBODIMENTS

Hereinafter, an embodiment of the present invention will be described in detail with reference to the drawings. An utterance generation apparatus of the present embodiment is an utterance generation apparatus that generates an utterance such as a question for digging an utterance of the other party in a chat conversation, and the like, and is utilized as a process to be performed on a chat conversation in an interaction system. The utterance generation apparatus ranks top N (N best) candidate utterance sentences that are output through automatic utterance generation and are most likely as response utterances, by using variables that can address the above-described two problems, to solve the problems.

By using a technique of the present embodiment for the interaction system, it is possible to accurately dig a conversation in depth. This enables the interaction system to collect more information of a user. Returning a response utterance utilizing the collected information to the user facilitates the user to have a conversation with the interaction system, and hence, smooth interaction can be expected between the interaction system and the user.

Figure 1:
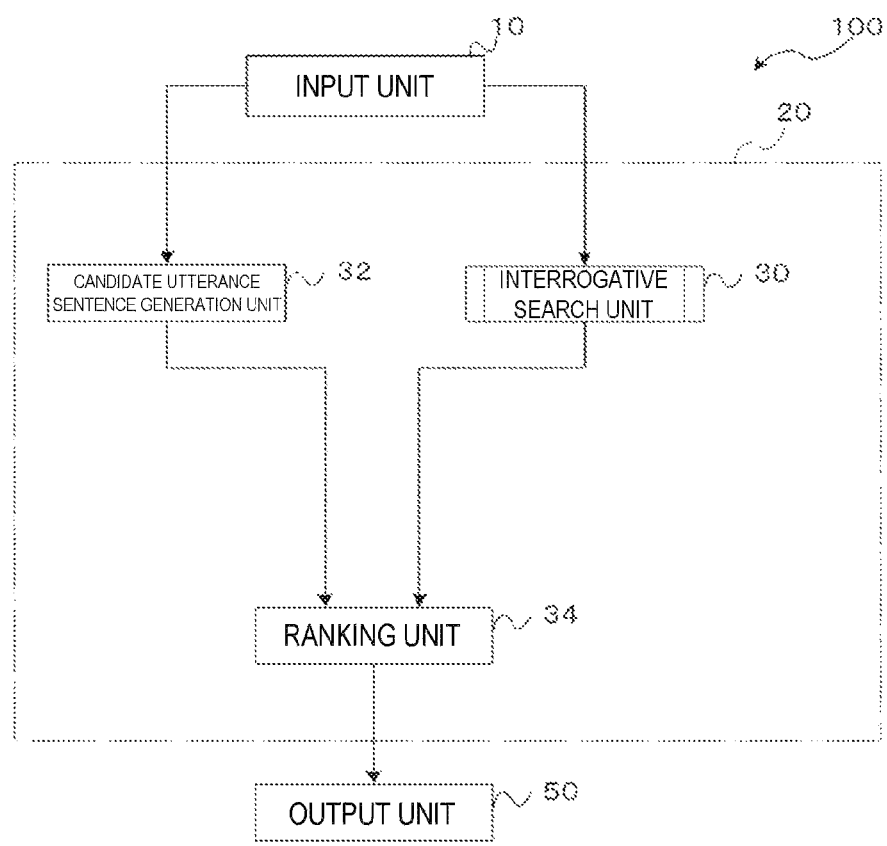
FIG. 1 is a block diagram illustrating a configuration of an utterance generation apparatus according to an embodiment of the present invention.

Configuration of Utterance Generation Apparatus According to Embodiment of Present Invention Next, a configuration of an utterance generation apparatus according to an embodiment of the present invention will be described. As illustrated in FIG. 1, an utterance generation apparatus 100 according to the embodiment of the present invention can be configured by a computer including a CPU, a RAM, a ROM that stores a program or various data for executing an utterance generation processing routine to be described later. The utterance generation apparatus 100 functionally includes an input unit 10, an operation unit 20, and an output unit 50 as illustrated in FIG. 1.

The input unit 10 receives text of an utterance sentence uttered by a user, who is the other party of an interaction.

The operation unit 20 is configured by including an interrogative search unit 30, a candidate utterance sentence generation unit 32, and a ranking unit 34.

The interrogative search unit 30 estimates estimated used interrogatives with a text of an utterance sentence received at the input unit 10, as an input, by using a predetermined rule, the estimated used interrogative being an interrogative related to the content of an utterance included in the text.

Figure 2:
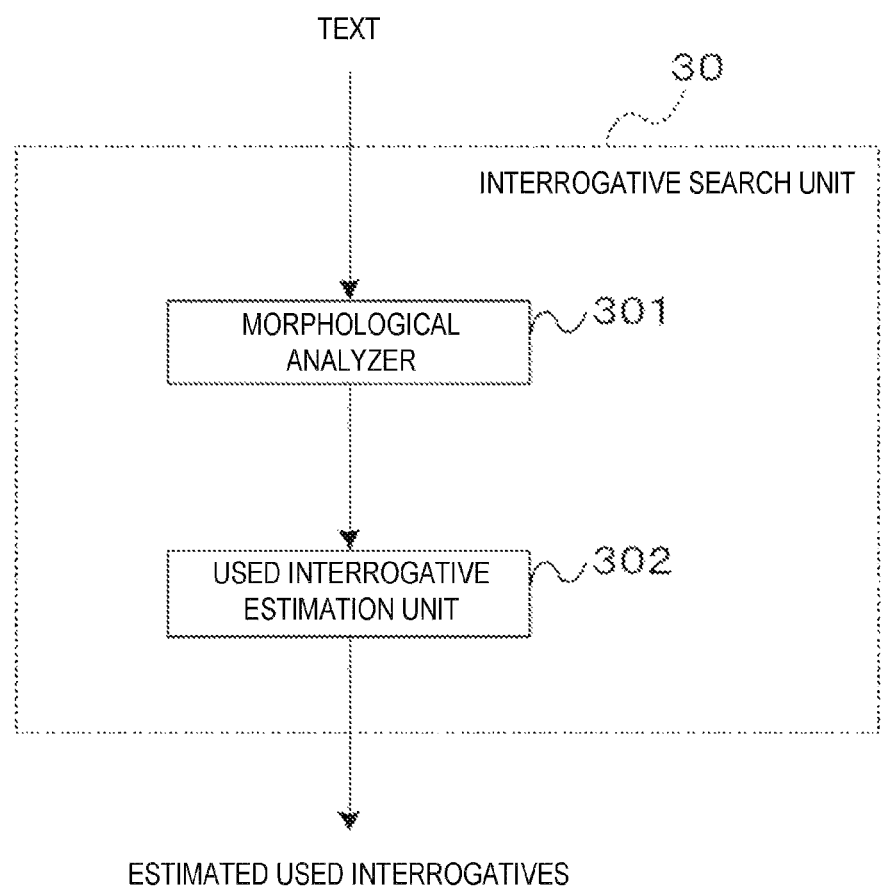
FIG. 2 is a block diagram illustrating a configuration of an interrogative search unit.

As illustrated in FIG. 2, the interrogative search unit 30 is configured by including a morphological analyzer 301 and a used interrogative estimation unit 302.

The morphological analyzer 301 receives an input of a text of an utterance sentence and performs a morphological analysis on the text.

The used interrogative estimation unit 302 estimates estimated used interrogatives from the result of the morphological analysis performed on the text of the utterance sentence, through matching based on a predetermined rule using parts of speech, a lexicon (see Reference 1), and designations. The estimated used interrogatives are each an interrogative related to the text of the utterance sentence, and is, for example, an interrogative that is used to ask about information known based on the content of the utterance sentence. In other words, a candidate utterance sentence including this estimated used interrogative includes a question about the known information. In light of this nature, the estimated used interrogative is used to perform such processing as to drop in ranking the candidate utterance sentence including the estimated used interrogative in a process by the ranking unit 34 to be described later. Although the estimated used interrogatives are estimated through matching using the predetermined rule in the present embodiment, estimation of estimated used interrogatives is not limited there to this, and estimated used interrogatives may be estimated by preparing an estimator that has learned in advance using learning data. The estimator may use a known technique such as a neural network or an SVM.

Reference 1: Satoru Ikehara, Masahiro Miyazaki, Satoru Shirai, Akio Yokoo, Hiromi Nakaiwa, Kentaro Ogura, Yoshifumi Ooyama, and Yoshihiko Hayashi, A Japanese Lexicon, Iwanami Shoten, 1997.

Figure 3:
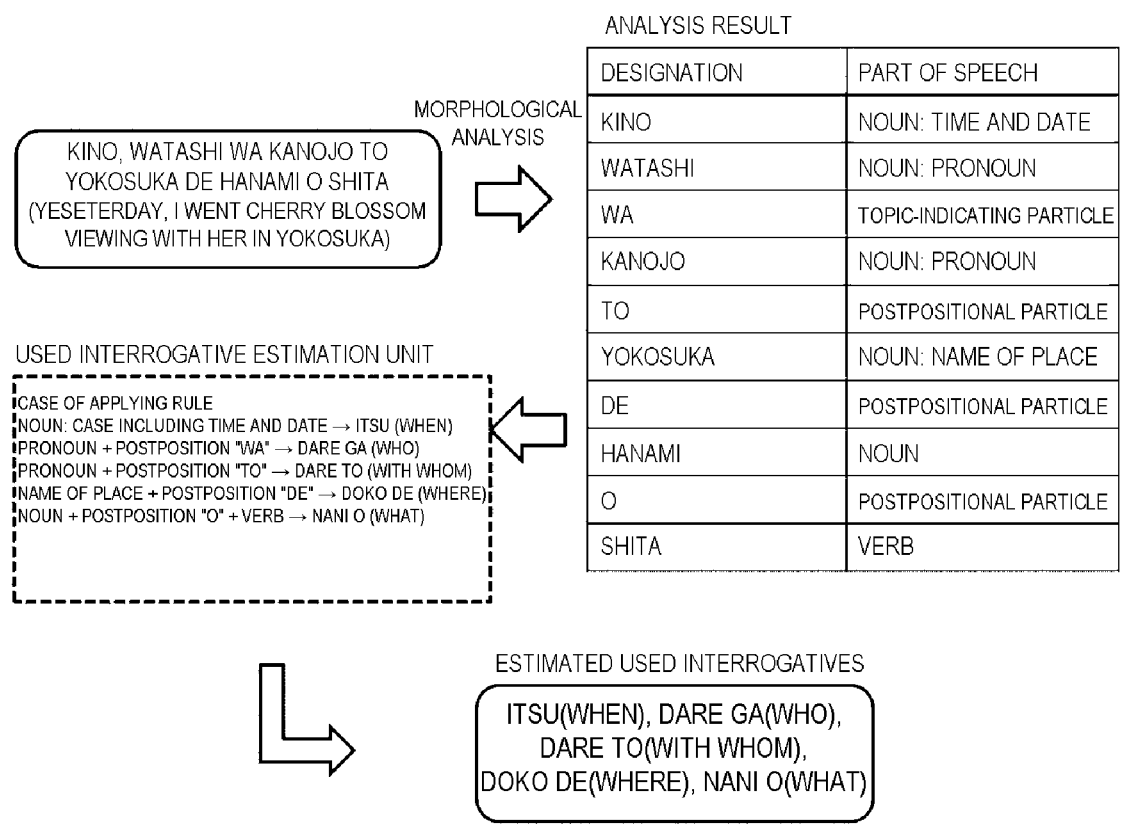
FIG. 3 is a diagram illustrating an example of processing of the interrogative search unit.

FIG. 3 illustrates an example of a process of the interrogative search unit 30. For example, suppose that input text is an utterance sentence that "Kino, watashi wa kanojo to Yokosuka de hanami o shita (Yesterday, I went cherry blossom viewing with her in Yokosuka)". The interrogative search unit 30 estimates "Itsu (when)", "dare ga (who)", "dare to (with whom)", "doko de (where)," and "nani o (what)" as estimated used interrogatives, based on the predetermined rule. The estimated used interrogatives estimated here are interrogatives corresponding to the contents made known from the user utterance, i.e., "kino (yesterday)/itsu", "watashi (I)/dare ga", "kanojo (her)/dare to", "Yokosuka de (in Yokosuka)/doko de", and "hanami o (cherry blossom viewing)/nani o", which are, from user's point of view, contents that the user has already answered.

An example other than that in FIG. 3 described above is an example that "nan de (why)" and "doshite (for what purpose)" are estimated as estimated used interrogatives. For example, assume that, in the predetermined rule, the interrogatives "nan de" and "doshite" are associated with "verb+postposition 'ni')". In this case, in a case that the text of an utterance sentence is "Gohan o tabe ni Yokohama ni ikimashita (I went to Yokohama to dine out)", "tabe (verb)+ni (postposition)" matches the predetermined rule, and hence "nan de" and "doshite" are estimated as estimated used interrogatives. A plurality of estimated used interrogatives are also conceivable, such as "do yatte (how)" "dore gurai (for how long)", and "dochira ga (which one)", other than those described in FIG. 3 and "nan de" and "doshite". What to specify as estimated used interrogatives and which utterance sentence each estimated used interrogative is associated with may be freely defined or configured.

In a case that a plurality of interactions are ongoing between a user and the interaction system, the interrogative search unit 30 may use a log of interactions (texts of a plurality of utterance sentences) of the user and the interaction system in the ongoing interactions, as texts of utterance sentences input to the input unit 10. Specifically, assume that K interactions are performed in the interaction system. In a case that the current interaction is K-th and the K-th utterance sentence is input to the input unit 10, estimated used interrogatives are estimated by also using texts serving as contexts of interactions obtained from a log of interactions previous to the K-th interaction (i.e., the log of first, second, . . . , to K−1-th interactions). As the texts serving as the contexts of the interactions, at least either the texts of response utterances previous to the K−1-th response utterance output from the output unit 50 previously or the texts of utterance sentences previous to the K−1-th utterance sentence input to the input unit 10 in generating the response utterances are used. Estimated used interrogatives may be estimated by using the predetermined rule or an estimator with the text serving as a context of the interaction and the text of the K-th utterance sentence as inputs. In this way, estimated used interrogatives corresponding to information made known previous to the K-th interaction can also be estimated. For example, assume that a log of previous interactions includes "(K=1: user) Kino, Yokosuka ni ittekita yo (Yesterday, I went to Yokosuka)", "(K=1: interaction system) Kino, Yokosuka dewa nani o shitan desu ka? (What did you do in Yokosuka yesterday)?", and "(K=2: user) Hanami o shi ni itta yo (I went cherry blossom viewing)". In this case, it is possible to estimate "kino (yesterday)/itsu (when)" and "Yokosuka de (in Yokosuka)/doko de (where)" as estimated used interrogatives from the log of interactions previous to the K−1-th utterance sentence and to also complement estimated used interrogatives other than "hanami o (cherry blossom viewing)/nani o (what)" that can be estimated from the K-th input utterance sentence. It is only required to freely configure how many interactions to go back to complement estimated used interrogatives.

In a case that interactions are ongoing between the user and the interaction system, the interrogative search unit 30 may store a record of estimated used interrogatives that have been estimated, and each estimated used interrogative that is newly estimated may be added to the record of the estimated used interrogatives to output the resultant as an estimation result of estimated used interrogatives to the ranking unit 34. This allows the ranking unit 34 to be processed in consideration of information made known in ongoing interactions, i.e., the contexts of the interactions.

The candidate utterance sentence generation unit 32 generates, with the text of an utterance sentence received at the input unit 10 as an input, each candidate utterance sentence for the utterance sentence through automatic utterance generation using a machine learning model. In a case of, for example, N best, N candidate utterance sentences are to be generated. It is assumed that a plurality of candidate utterances are generated, and, in a case of N=5, i.e., 5 best, five candidate utterance sentences are to be generated while, in a case of N=10, i.e., 10 best, 10 candidate utterance sentences are to be generated, for example. In the present embodiment, it is assumed that an encoder-decoder model (see NPL 1) based on a neural network as a machine learning model is used for automatic utterance generation of a candidate utterance sentence. However, a generation model is not limited to this, and another generation model such as HMM may be used.

The ranking unit 34 calculates a score for each candidate utterance sentence generated by the candidate utterance sentence generation unit 32, based on the candidate utterance sentence and the estimation result of estimated used interrogatives by the interrogative search unit 30, to thereby rank the candidate utterances.

The output unit 50 selects a candidate utterance, based on the candidate utterance sentences and the calculation result of the scores by the ranking unit 34 and outputs the selected candidate utterance sentence as a response utterance of the interaction system.

Specifically, the ranking unit 34 calculates a score of each candidate utterance sentence obtained from the candidate utterance sentence generation unit 32, according to equation (1) below with the candidate utterance sentence and the estimation result of estimated used interrogatives obtained from the interrogative search unit 30 as inputs, and ranks the candidate utterance sentences.

$$T' = \mathrm{argmax}\ T\{\log P(T|S) + \log P(S|T) - wh\_\mathrm{penalty}(T, S)\} \quad (1)$$

Here, S denotes the text of an input utterance sentence, and T denotes one candidate utterance sentence among the candidate utterance sentences obtained from the candidate utterance sentence generation unit 32. log P(T|S) is a value representing a likelihood that a candidate utterance sentence (T) appears as a response utterance in a case that an utterance sentence (S) is given, and log p(S|T) is a value representing a likelihood that an input is the utterance sentence (S) when the candidate utterance sentence (T) is given. These values may be any values that represent a likelihood of the input utterance sentence S and each candidate utterance sentence T to be a pair of an interaction. In the present embodiment, two models are used as machine learning models to calculate probabilities, i.e., a neural network that has learned in advance to generate T from S and a neural network that has learned in advance to generate S from T. From the model for generating T from S, a generation probability P(T|S) at the time of generating T from S is obtained, and from the model for generating S from T, a generation probability P(S|T) at the time of generating S from T is obtained. However, only P(T|S) may be used. wh_penalty (T,S) is a value determined depending on whether an estimated used interrogative is included in a candidate utterance sentence. In a case that an estimated used interrogative is included in the candidate utterance sentence (T), a value a, which is a penalty (e.g., α=1), is given as the value of wh_penalty. Note that, for a candidate utterance sentence not including any estimated used interrogative, such a value of wh_penalty (e.g., −1) as to make the candidate utterance sentence likely to be selected may be given.

However, in calculating a score TA, in a case that a certain degree of generation probability is guaranteed at the time when N best is generated, only the value of wh_penalty in equation (1) above is sufficient in some cases. This is considered to be, for example, a case that only an obvious response is conceivable and a case that N is a small value, such as N=3. In a case of increasing the number N, such as N=30, to increase the number of candidate utterance sentences, it is in some cases impossible to guarantee sufficient generation probabilities. In this case, calculating scores by taking account of generation probabilities can give a score to each candidate utterance sentence in consideration of both a likelihood of an input utterance and a response utterance as a pair and the context of the interaction.

A specific example of a process of the ranking unit 34 is described below.

Assume that five candidate utterance sentences, i.e., "nan de? (why?)", "doko de yatteta no? (where was it held?)", "itsu no hanami? (when was the cherry blossom viewing held?)", "donna kanji datta no? (how was it?)", and "dare to itta no? (who did you go with?)", are obtained from the candidate utterance sentence generation unit 32 for an input "Kino, watashi wa kanojo to Yokosuka de hanami o shita (Yesterday, I went cherry blossom viewing with her in Yokohama)".

The ranking unit 34 associates estimated used interrogatives with the candidate utterance sentences, extracts each part where any of the estimated used interrogatives is used in the candidate utterance sentences as underlined parts illustrated in FIG. 4, and gives 1 to wh_penalty of each candidate utterance sentence including the estimated used interrogative.

The ranking unit 34 calculates scores required to rank the candidate utterance sentences, according to equation (1) above. A calculation result of the scores of the respective candidate utterance sentences are illustrated in FIG. 5.

In the example of FIG. 5, the candidate utterance sentence having the greatest score is "donna kanji datta no? (how was it?)" and selects this candidate utterance sentence to output, to the output unit 50, the candidate utterance sentence as a response utterance of the interaction system.

As described above, the ranking unit 34 uses equation (1) above to compare candidate utterance sentences each including an estimated used interrogative and candidate utterance sentences each not including any estimated used interrogative among the candidate utterance sentences, and calculates scores of the respective candidate utterance sentences so that the candidate utterance sentences each including an estimated used interrogative is less likely to be selected.

By taking into account log P(S|T) as in equation (1) above, it is possible, in a case, for example, that the text of an utterance sentence is "Yokohama ni ittan desu (I went to Yokohama)", to consider that the probability of providing "Akarenga ni ittan desu ka? (Did you go to Red Brick?)" as a candidate utterance sentence is to be high. This can reduce the possibility of asking a question with a general-purpose interrogative that can deal with any utterance.

Figure 6:
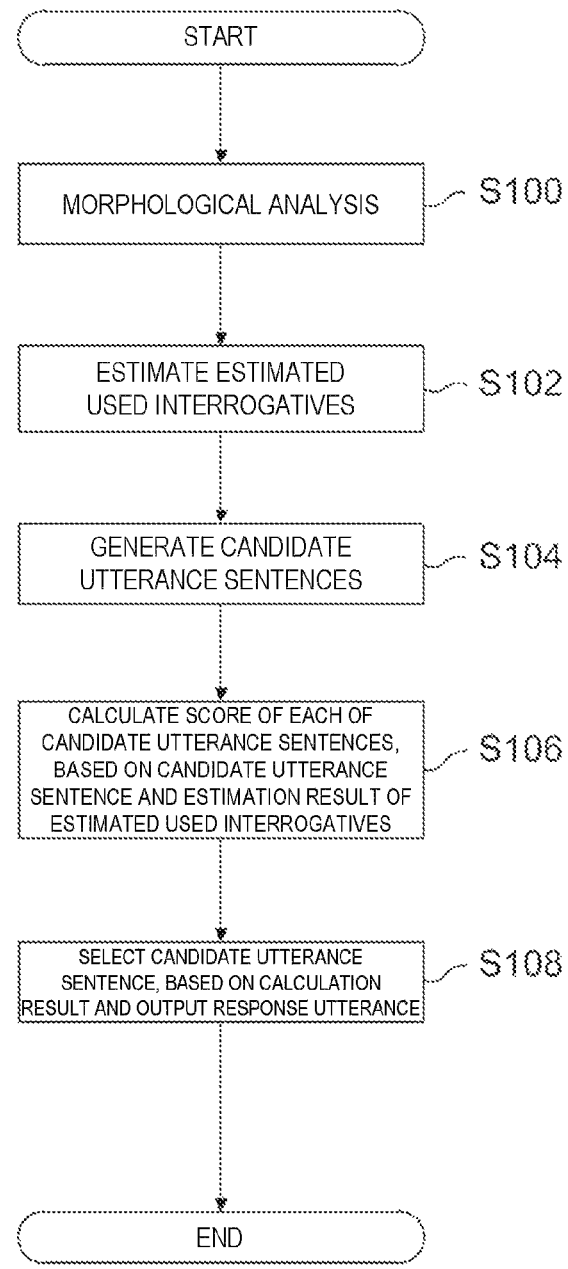
FIG. 6 is a flowchart illustrating an utterance generation processing routine in the utterance generation apparatus according to the embodiment of the present invention.

Effects of Utterance Generation Apparatus According to Embodiment of Present Invention Next, effects of the utterance generation apparatus 100 according to the embodiment of the present invention will be described. The input unit 10 receives a text of an utterance sentence uttered by a user, who is the other party of an interaction, and the utterance generation apparatus 100 executes an utterance generation processing routine illustrated in FIG. 6.

First, in step S100, the interrogative search unit 30 performs a morphological analysis on the text of the utterance sentence received by the input unit 10.

Next, in step S102, the interrogative search unit 30 estimates estimated used interrogatives, the estimated used interrogatives being interrogatives related to the content of the utterance included in the text, from the result of the morphological analysis with a predetermined rule.

In step S104, with the text of the utterance sentence received by the input unit 10 as an input, the candidate utterance sentence generation unit 32 generates candidate utterance sentences for the utterance sentence through automatic utterance generation using a machine learning model.

In step S106, the ranking unit 34 calculates a score for each candidate utterance sentence generated by the candidate utterance sentence generation unit 32, based on the candidate utterance sentence and the estimation result of estimated used interrogatives by the interrogative search unit 30.

In step S108, the output unit 50 selects a candidate utterance sentence, based on the calculation result of the scores in step S106, and outputs the selected candidate utterance sentence as a response utterance of the interaction system.

As described above, with the utterance generation apparatus according to the embodiment of the present invention, it is possible to ask an appropriate question for digging an utterance of the other party in depth. For example, while many questions that can deal with any utterance (for example, "nan de (why)", "doshite (for what purpose)", and the like) are generated in known techniques, it is less likely, with the utterance generation apparatus according to the embodiment of the present invention, that candidate utterance sentences including "nan de" and "doshite" are selected in a case that contents related to "nan de" and "doshite" are known from an input utterance sentence. In addition, it is less likely that candidate utterance sentences each including an interrogative corresponding to known contents from an input utterance sentence is selected.

Note that the present invention is not limited to the above-described embodiments, and various modifications and applications may be made without departing from the gist of the present invention.

For example, in the embodiment described above, a description has been given by taking, as an example, a case in which the ranking unit 34 ranks candidate utterance sentences having high scores, but the present invention is not limited to this. For example, it may be designed by replacing equation (1) above with such an equation as to give low scores, to calculate scores according to the equation replaced with and to rank candidate utterance sentences having low scores. In this case, it is designed that a candidate utterance sentence (T) including an estimated used interrogative is provided with a high score as a value of wh_penalty, to make the candidate utterance sentence (T) less likely to be selected.

REFERENCE SIGNS LIST

10 Input unit
20 Operation unit
30 Interrogative search unit
32 Candidate utterance sentence generation unit
34 Ranking unit
50 Output unit
100 Utterance generation apparatus
301 Morphological analyzer
302 Used interrogative estimation unit

The invention claimed is:

1. An utterance generation apparatus comprising a processor configured to execute operations comprising:
receiving an input utterance sentence in textual form;
estimating an interrogative to the input utterance sentence by using a predetermined rule or a trained interrogative estimation model;
automatically generating, based at least on the input utterance sentence, a plurality of candidate utterance sentences as questions in response to the input utterance sentence;
calculating, based on a likelihood of whether a candidate utterance sentence of the plurality of the candidate utterance sentences includes the interrogative, a score for the candidate utterance sentence of the plurality of candidate utterance sentences;
determining, based on the score, a rank of the candidate utterance sentence of the plurality of candidate utterance sentences; and
transmitting, based on the rank, the candidate utterance sentence as a question in response to the input utterance sentence.

2. The utterance generation apparatus according to claim 1, the calculating the score further comprises:
calculating the score of the candidate utterance sentence of the plurality of candidate utterance sentences wherein the score of the candidate utterance sentence causes the candidate utterance sentence to be less likely to be selected than another candidate utterance sentence of the plurality of candidate utterance sentence, the candidate utterance response includes the interrogative, and said another candidate utterance sentence of the plurality of candidate utterance sentences is without the interrogative.

3. The utterance generation apparatus according to claim 1, wherein the automatically generating the plurality of candidate utterance sentences further comprises inputting the input utterance sentence into a machine learning model that to output the candidate utterance sentence.

4. The utterance generation apparatus according to claim 1, wherein an interaction in an interaction system continues, and the estimating the interrogative further comprises using the predetermined rule or the trained interrogative estimation model according to a text serving as a context of the interaction and the input utterance sentence.

5. The utterance generation apparatus according to claim 2, wherein the calculating the score further comprises calculating the score based on:
a first value representing a likelihood that the candidate utterance sentence appears in the input utterance sentence;
a second value representing a likelihood that the input utterance sentence appears in the candidate utterance sentence; and
a penalty value according to whether the estimated interrogative is a part of the input candidate utterance sentence.

6. An utterance generation method comprising:
receiving an input utterance sentence in textual form;
estimating an interrogative to the input utterance sentence, by using a predetermined rule or a trained interrogative estimation model;
automatically generating, based at least on the input utterance sentence, a plurality of candidate utterance sentences as questions in response to the input utterance sentences;
calculating, based on a likelihood of whether a candidate utterance sentence of the plurality of candidate utterance sentences includes the interrogative, a score for the candidate utterance sentence of the plurality of candidate utterance sentences;
determining, based on the score, a rank of the candidate utterance sentence of the plurality of candidate utterance sentences; and
transmitting, based on the rank, the candidate utterance sentence as a question in response to the input utterance sentence.

7. A non-transitory computer-readable recording medium having computer-readable instructions stored therein, which when executed, causes a computer including a memory and a processor to execute operations comprising:
receiving an input utterance sentence in textual form;
estimating an interrogative to the input utterance sentence by using a predetermined rule or a trained interrogative estimation model;
automatically generating, based at least on the input utterance sentence, a plurality of candidate utterance sentences as questions in response to the input utterance sentence;
calculating, based on a likelihood of whether a candidate utterance sentence of the plurality of the candidate utterance sentences includes the interrogative, a score for the candidate utterance sentence of the plurality of candidate utterance sentences;
determining, based on the score, a rank of the candidate utterance sentence of the plurality of candidate utterance sentences; and
transmitting, based on the rank, the candidate utterance sentence as a question in response to the input utterance sentence.

8. The utterance generation apparatus according to claim 2, wherein the automatically generating the plurality of candidate utterance sentences further comprises inputting the input utterance sentence into a machine learning model that to output the candidate utterance sentence.

9. The utterance generation apparatus according to claim 2, wherein an interaction in an interaction system continues, and the estimating the interrogative further comprises using the predetermined rule or the trained interrogative estimation model according to a text serving as a context of the interaction and the input utterance sentence.

10. The utterance generation method according to claim 6, the calculating the score further comprises:
calculating the score of the candidate utterance sentence of the plurality of candidate utterance sentences wherein the score of the candidate utterance sentence is less likely to be selected than another candidate utterance sentence of the plurality of candidate utterance sentence, the candidate utterance response includes the interrogative, and said another candidate utterance sentence of the plurality of candidate utterance sentences is without the interrogative.

11. The utterance generation method according to claim 6, wherein the automatically generating the plurality of candidate utterance sentences further comprises inputting the input utterance sentence into a machine learning model that to output the candidate utterance sentence.

12. The utterance generation method according to claim 6, wherein an interaction in an interaction system continues, and the estimating the interrogative further comprises using the predetermined rule or the trained interrogative estimation model according to a text serving as a context of the interaction and the input utterance sentence.

13. The utterance generation method according to claim 10, wherein the calculating the score further comprises calculating the score based on at least one of:
a first value representing a likelihood that the candidate utterance sentence appears in the input utterance sentence;
a second value representing a likelihood that the input utterance sentence appears in the candidate utterance sentence; or
a penalty value determined depending on whether the estimated interrogative is a part of the input candidate utterance sentence.

14. The utterance generation method according to claim 10, wherein the automatically generating the plurality of candidate utterance sentences further comprises inputting the input utterance sentence into a machine learning model that to output the candidate utterance sentence.

15. The utterance generation method according to claim 10, wherein an interaction in an interaction system continues, and the estimating the interrogative further comprises using the predetermined rule or the trained interrogative estimation model according to a text serving as a context of the interaction and the input utterance sentence.

16. The non-transitory computer-readable recording medium according to claim 7, the calculating the score further comprises:
 calculating the score of the candidate utterance sentence of the plurality of candidate utterance sentences wherein the score of the candidate utterance sentence is less likely to be selected than another candidate utterance sentence of the plurality of candidate utterance sentence, the candidate utterance response includes the interrogative, and said another candidate utterance sentence of the plurality of candidate utterance sentences is without the interrogative.

17. The non-transitory computer-readable recording medium according to claim 7, wherein the automatically generating the plurality of candidate utterance sentences further comprises inputting the input utterance sentence into a machine learning model that to output the candidate utterance sentence.

18. The non-transitory computer-readable recording medium according to claim 7, wherein an interaction in an interaction system continues, and the estimating the interrogative further comprises using the predetermined rule or the trained interrogative estimation model according to a text serving as a context of the interaction and the input utterance sentence.

19. The non-transitory computer-readable recording medium according to claim 16, wherein an interaction in an interaction system continues, and the estimating the interrogative further comprises using the predetermined rule or the trained interrogative estimation model according to a text serving as a context of the interaction and the input utterance sentence.

20. The non-transitory computer-readable recording medium according to claim 16, wherein the automatically generating the plurality of candidate utterance sentences further comprises inputting the input utterance sentence into a machine learning model that to output the candidate utterance sentence.

\* \* \* \* \*